United States Patent
Wu

(10) Patent No.: US 6,896,214 B2
(45) Date of Patent: May 24, 2005

(54) FRUIT GRATING TOOL

(75) Inventor: Ming-Feng Wu, Tainan (TW)

(73) Assignee: Yienn Lih Enterprise Co., Ltd., Tainan (TW)

(*) Notice: Subject to any disclaimer, the term of this patent is extended or adjusted under 35 U.S.C. 154(b) by 89 days.

(21) Appl. No.: 10/616,928

(22) Filed: Jul. 11, 2003

(65) Prior Publication Data

US 2005/0005454 A1   Jan. 13, 2005

(51) Int. Cl.[7] .......................... A01D 34/90; A47J 42/00; A47J 43/00
(52) U.S. Cl. .................. 241/169.1; 241/168; 241/169; 241/95; 241/69
(58) Field of Search ........................... 241/69, 95, 168, 241/169, 169.1

(56) References Cited

U.S. PATENT DOCUMENTS

| | | | | |
|---|---|---|---|---|
| 926,327 A | * | 6/1909 | Hoffman | 241/273.2 |
| 3,581,790 A | * | 6/1971 | Conte | 241/88.1 |
| 4,212,430 A | * | 7/1980 | Dale et al. | 241/89.4 |
| 4,711,167 A | * | 12/1987 | Sano | 99/510 |

\* cited by examiner

*Primary Examiner*—Allen Ostrager
*Assistant Examiner*—Jason Y Pahng
(74) *Attorney, Agent, or Firm*—Rosenberg, Klein & Lee

(57) ABSTRACT

A fruit grating tool includes a tube-shaped housing, a cap releasably connected to the housing, a pressing member arranged under the cap and biased down by a spring, a rotary member having a knob arranged on top of the cap, and a grating base arranged under the pressing member and connected to the rotary member; the grating base has a grating surface on an upper side thereof, and many sharp edged tangential holes thereon; fruits are put on the grating base to be pressed against the grating surface by means of the pressing member, and are grated by means of the grating surface when the knob is operated to cause the grating base to rotate; the fruits will pass down via the sharp edged tangential holes of the grating base after having been grated into small pieces.

6 Claims, 7 Drawing Sheets

FRUIT GRATING TOOL

BACKGROUND OF THE INVENTION

1. Field of the Invention

The present invention relates to a fruit grating tool, more particularly one, which is safe to use, and can prevent the user's hands from touching the fruit or small pieces made out of the fruit in operation.

2. Brief Description of the Prior Art

Some fruits, e.g. garlic, are usually previously grated into small pieces or mud for use in cooking and dining. Referring to FIG. 8, a conventional tool 10 is provided for grating fruits into small pieces or mud with. The tool 10 is in the shape of a board, and has a grating section 201 formed with sloping teeth 20 neatly arranged into lines and rows. To grate a fruit with the tool, the user holds the fruit with one hand, and rubs the fruit on the grinding section 201 to and fro. Thus, the fruit becomes small pieces.

It is found that there are disadvantages of the tool as followings:
1. The fruit will become smaller and smaller to be difficult to hold firmly during the course of its being rubbed against the grating section. Furthermore, the user's hand is likely to be rubbed against the grating section to be injured accidentally if the user fails to hold the fruit firmly in using the tool. In other words, the tool is not safe to use.
2. The user's hands will become garlicky, and could smell unpleasant to other peoples or the user after rubbing garlic on the tool to produce garlic mud.
3. Fruits could be contaminated when they are rubbed against the tool to become small pieces in case the user's hands are dirty, i.e. it could be not hygienic enough to use the tool to grate foods.

SUMMARY OF THE INVENTION

It is a main object of the present invention to provide a fruit grating tool to overcome the above disadvantages.

The present grating tool includes a tube-shaped housing, a hollow cap releasably connected to an upper end of the housing, a pressing member arranged under the cap and biased down by a spring, a rotary member having a knob arranged on top of the cap, and a grating base arranged under the pressing member and connected to the rotary member; the grating base has a grating surface on an upper side thereof, and sharp edged tangential holes. Thus, fruits put on the grating base can be pressed against the grating surface by means of the pressing member, and will be grated by means of the sharp edged tangential holes when the knob is operated to cause the grating base to rotate. Therefore, the tool is safe to use, and the user's hands won't have odors of the fruits remaining thereon because the user doesn't have to hold a fruit in operating the present tool.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
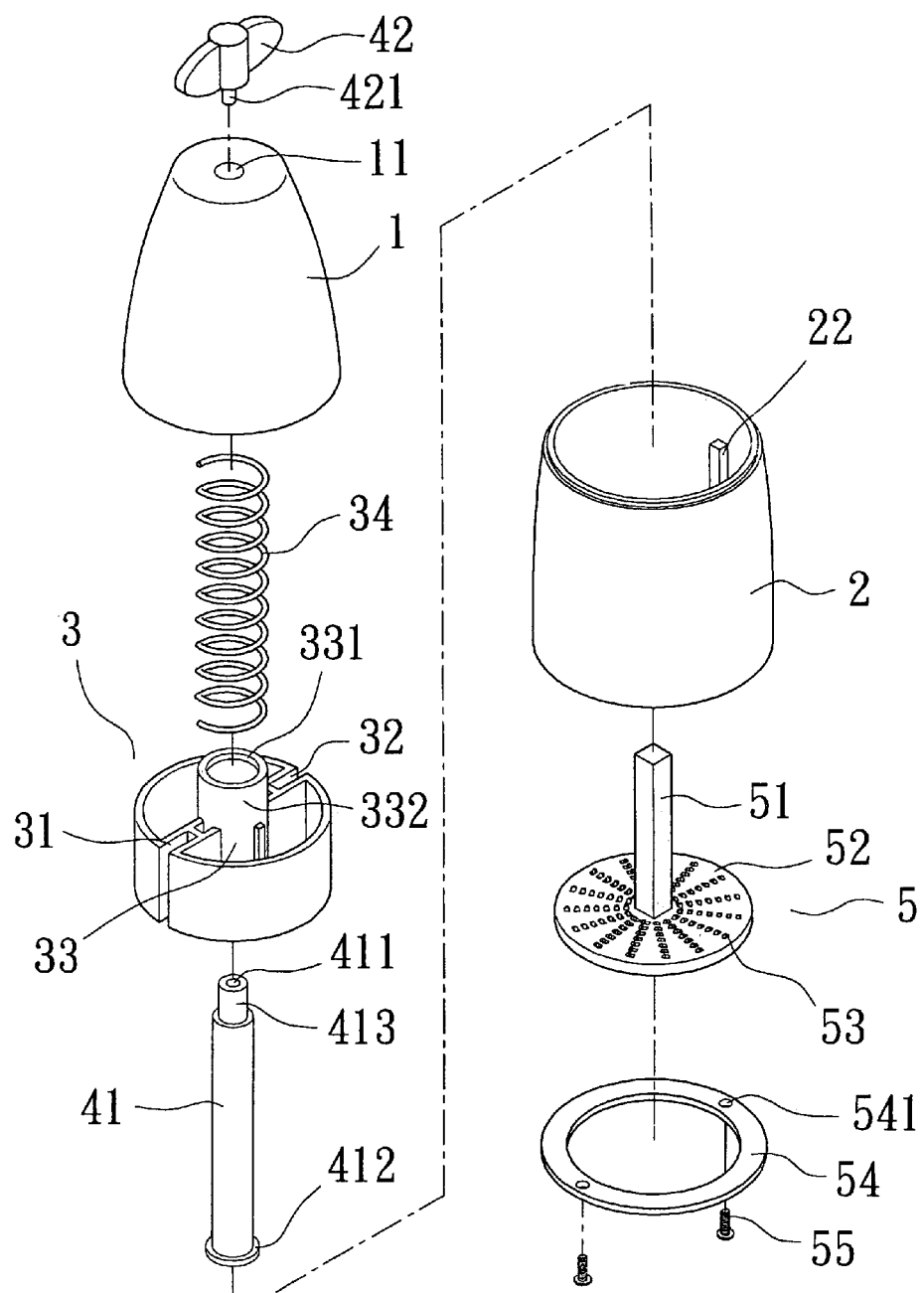
FIG. 1 is an exploded perspective view of the tool for grating fruits according to the present invention.

Referring to FIG. 1, a preferred embodiment of a fruit grating tool in the present invention includes a cap 1, a main housing 2, a pressing member 3, a rotary member 4, and a grating base 5.

Referring to FIGS. 1 to 5, the cap 1 is hollow, and has a through hole 11 on the middle of the top thereof, and a locating tube 12 projecting down from the middle of the bottom to be aligned with the through hole 11. The cap 1 is releasably coupled to an upper end of the main housing 2.

The main housing 2 is substantially in the shape of a tube with openings at two ends. The main housing 2 is formed with two opposing guiding bars 21, 22 on an inner side thereof, an annular holding recess 23 on the lower end, and screw holes 24 extending from the holding recess 23.

The pressing member 3 is up and down movable in the main housing 2. The pressing member 3 has two guiding trenches 31, 32 at opposite directions on the edge, a locating tube portion 33 at the middle, and a holding surface 35 on the bottom. The locating tube portion 33 is formed with an annular protrusion on an inner side of the upper end 331 so that the upper end 331 has a smaller inner diameter than other portion of the locating tube portion 33. The locating tube portion 33 has an upper section 332 for holding an elastic element 34 in position that is passed around it.

The rotary member 4 is provided for rotating the grating base 5 with. The rotary member 4 has a shaft 41, and a knob 42. The shaft 41 has an upper end portion 413 smaller than other portions thereof in diameter, an annular protrusion 412 on the lower end, and a through hole 411 extending from the top to the lower end thereof. The through hole 411 includes an upper connecting portion, and a lower engaging section 4111 formed in such a manner as to have a polygonal horizontal cross-section.

The grating base 5 is to be turned relative to the pressing member 3 in the main housing 2 by means of the rotary member 4. The grating base 5 is in the shape of a disk. The grating base 5 has a connecting post 51 projecting up from the middle of an upper side thereof, a grating surface 52 on the upper side thereof, and many sharp edged tangential holes 53. The connecting post 51 has a polygonal horizontal cross-section to be capable of fitting in the lower engaging section 4111 of the hole 411 of the shaft 41. A ringed fixed plate 54 is provided for preventing the grating base 5 from falling out of the main housing 2; the ringed fixed plate 54 has through holes 541 thereon.

Figure 2:
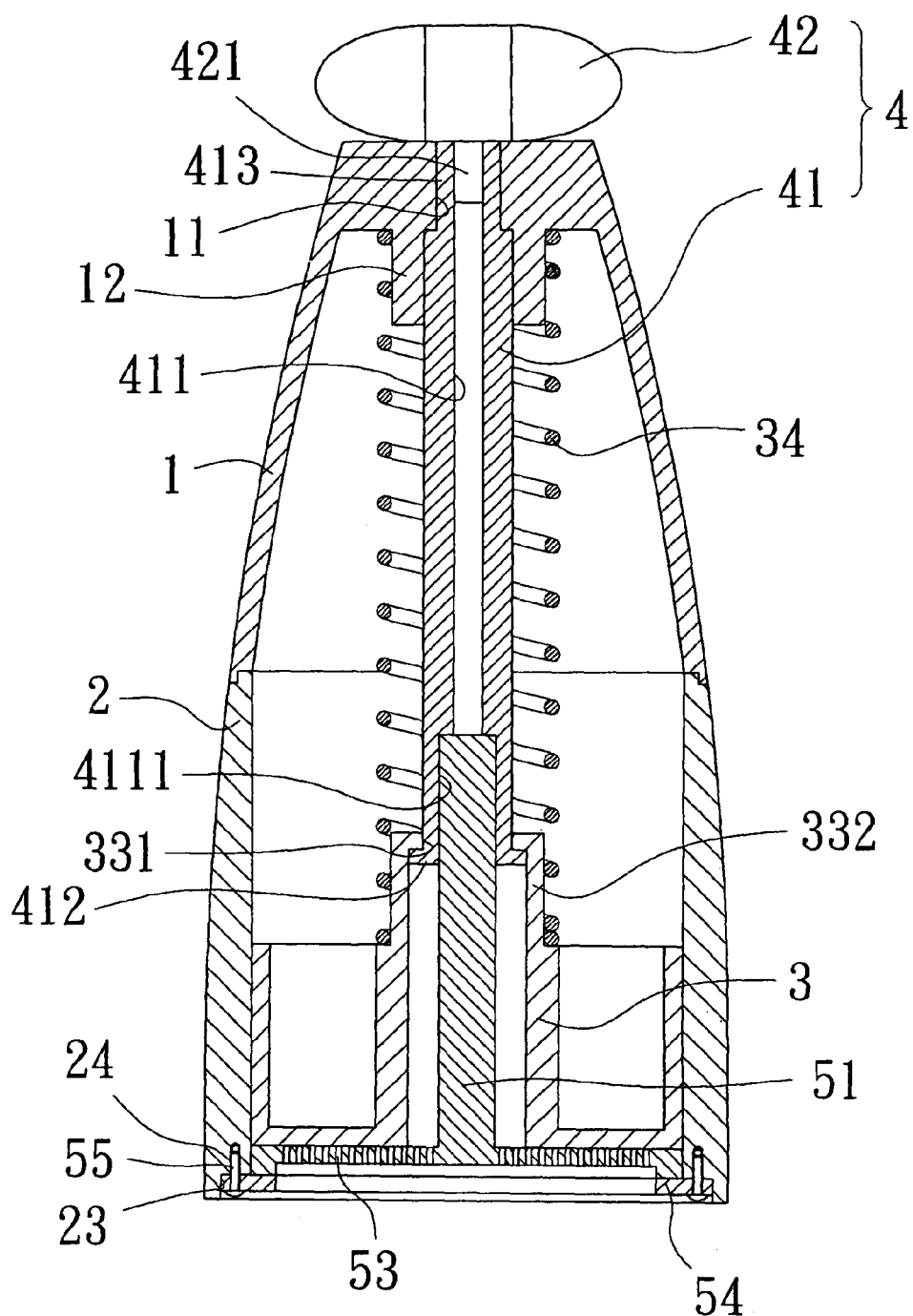
FIG. 2 is a vertical section of the tool for grating fruits according to the present invention.
Figure 3:
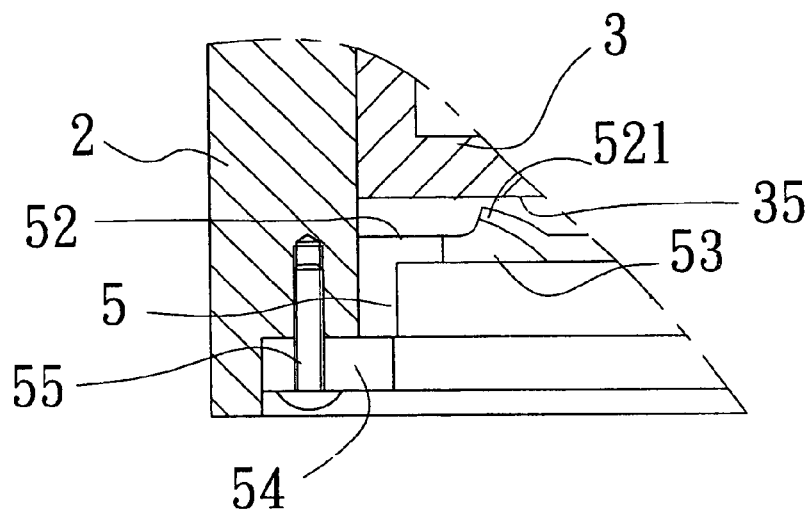
FIG. 3 is a partial cross-sectional view of the tool for grating fruits according to the present invention.
Figure 4:
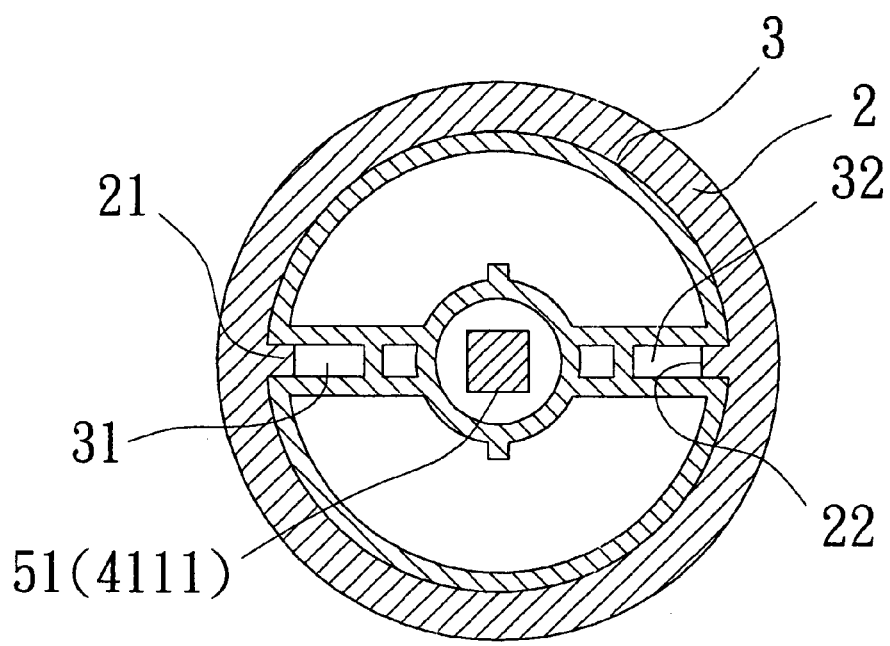
FIG. 4 is a horizontal section of the tool for grating fruits according to the present invention.
Figure 5:
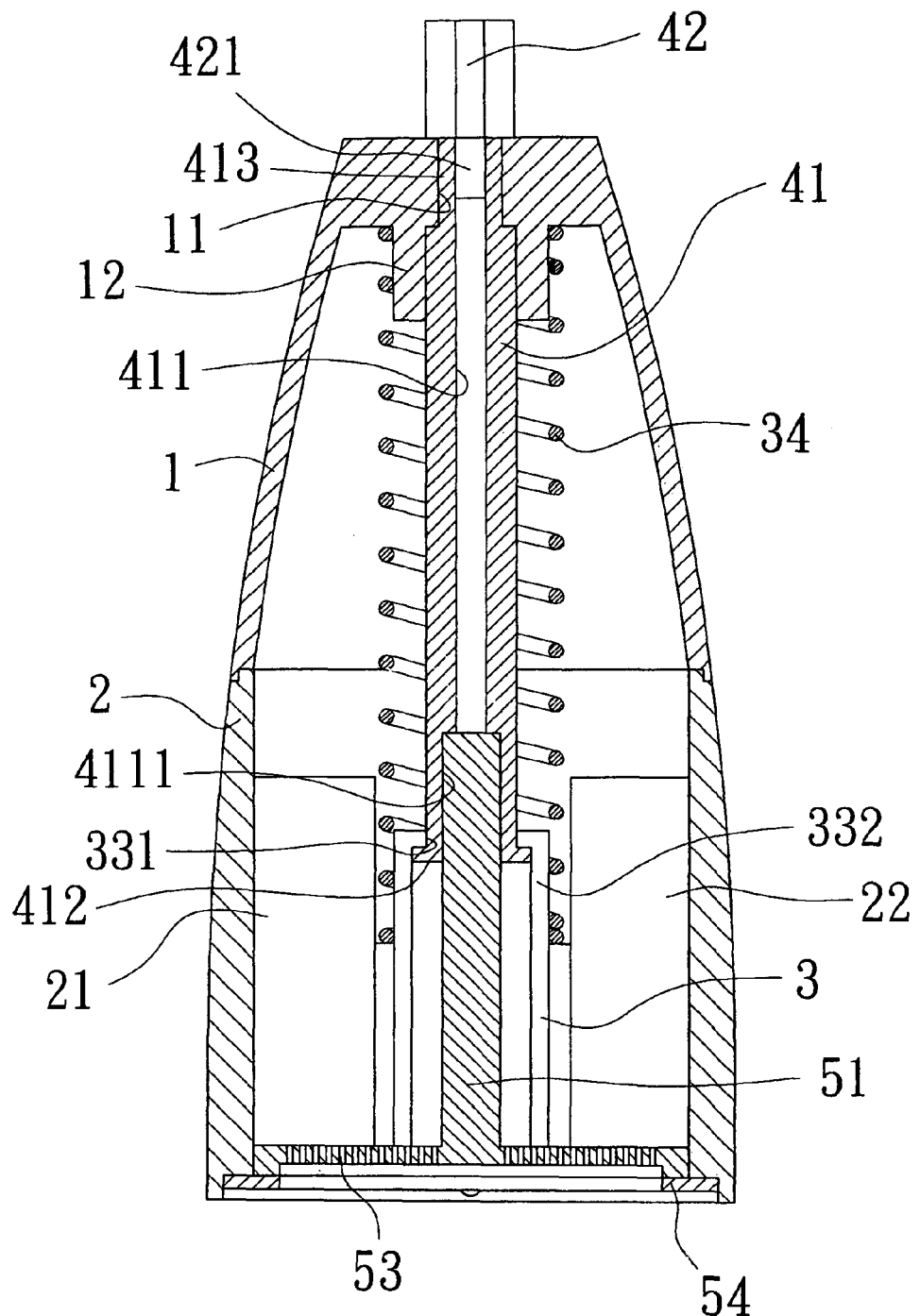
FIG. 5 is another vertical section of the tool for grating fruits according to the present invention.

To assemble the present grating tool, referring to FIGS. 2, and 4, first, the grating base 5 is passed into the housing 2 from the lower opening of the housing 2 so that it is received in the lower end of the housing 2 with the guiding bars 21, 22 stopping it from moving upwards. And, the ringed fixed plate 54 is positioned over the annular holding recess 23, and secured to the main housing 2 by means of screwing bolts 55 into the holes 541 as well as the screw holes 24; thus, the grating base 5 is prevented from falling out of the main housing 2. Secondly, the engaging section 4111 of the shaft 41 is fitted onto the connecting post 51. Thirdly, the locating tube portion 33 of the pressing member 3 is passed around the shaft 41 while the guiding trenches 31, 32 of the pressing member 3 are respectively fitted over the guiding bars 21, 22 of the main housing 2 so that the pressing member 3 is only allowed to move up and down in the housing 2; the annular protrusion of the upper end 331 of the tube portion 33 will cooperate with the annular protrusion 412 of the shaft 41 to prevent the pressing member 3 from moving down and away from the shaft 41. Fourthly, an elastic element 34 is passed around the shaft 41 as well as the upper locating section 332 of the locating tube portion 33 at a lower end thereof. Then, the cap 1 is coupled to the main housing 2 with the locating tube 12 being passed around the shaft 41, and passed into an upper end of the elastic element 34; the thinner upper end portion 413 of the shaft 41 will be passed into the middle through hole 11 while other lower portions of the shaft 41 will be detained under by the cap 1; thus, the pressing member 3 is biased towards the grating base 5 by the elastic element 34. Finally, the knob 42 is joined to the shaft 41 with the connecting pin 421 being connected to the upper end of the hole 411 of the shaft 41.

Figure 6:
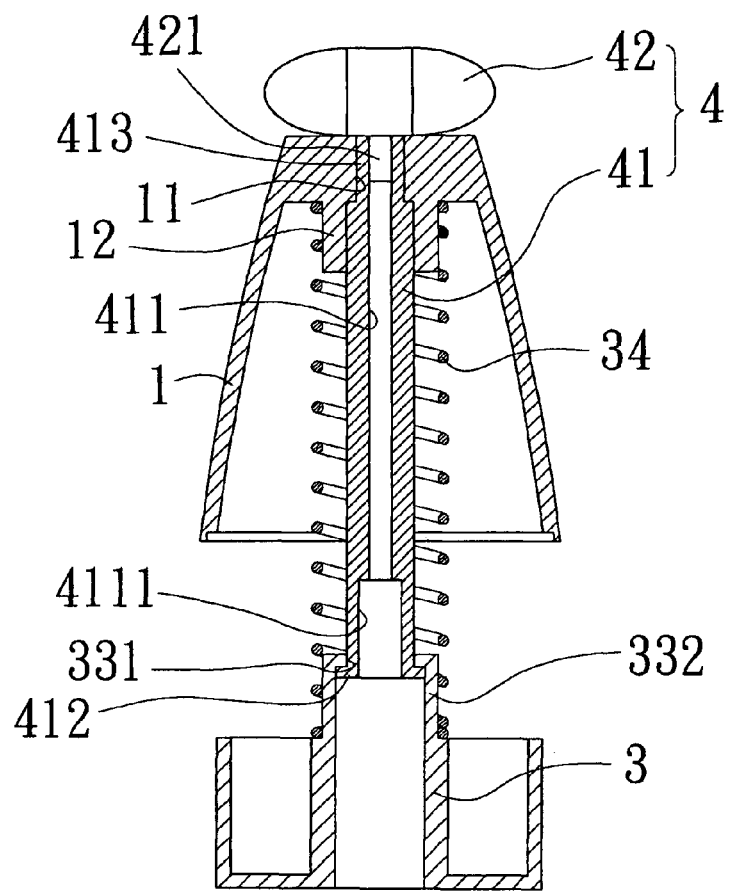
FIG. 6 is a view of the grating tool of the present invention being opened for fruits to be put therein, FIG. 7 a vertical section of the fruit grating tool of the present invention in use.
Figure 6:
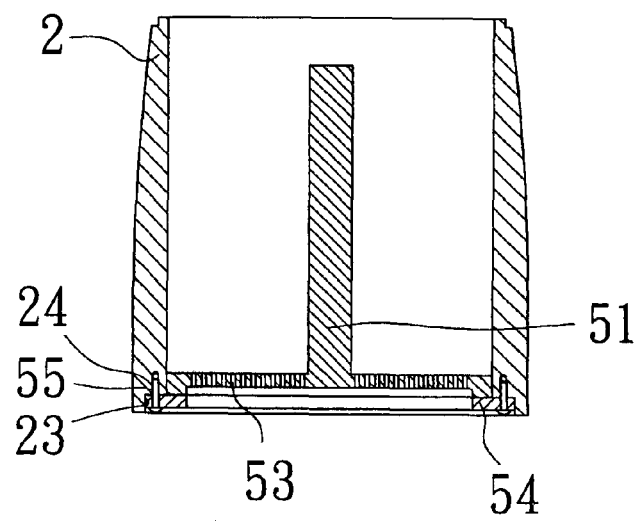
Figure 7:
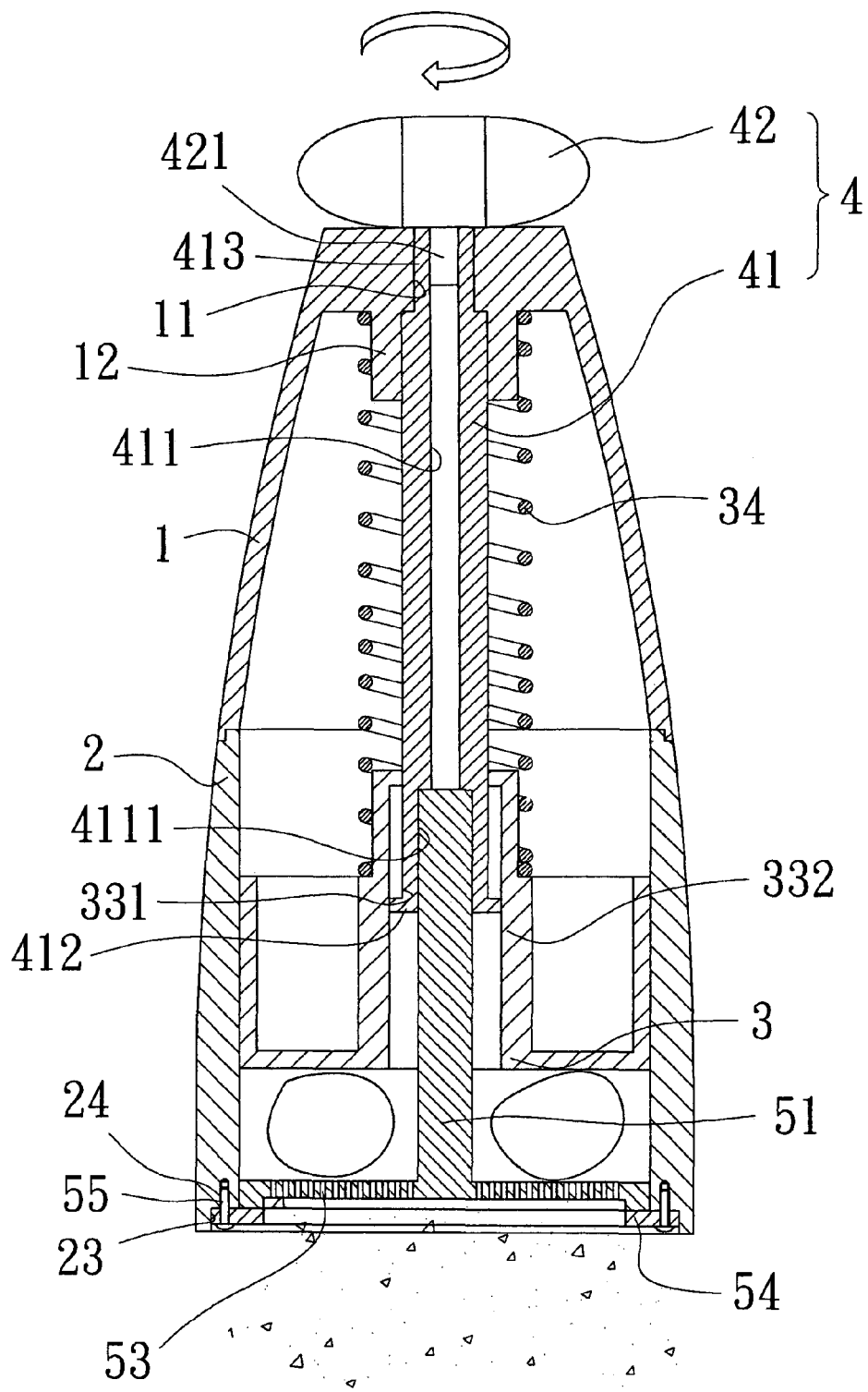
Figure 8:
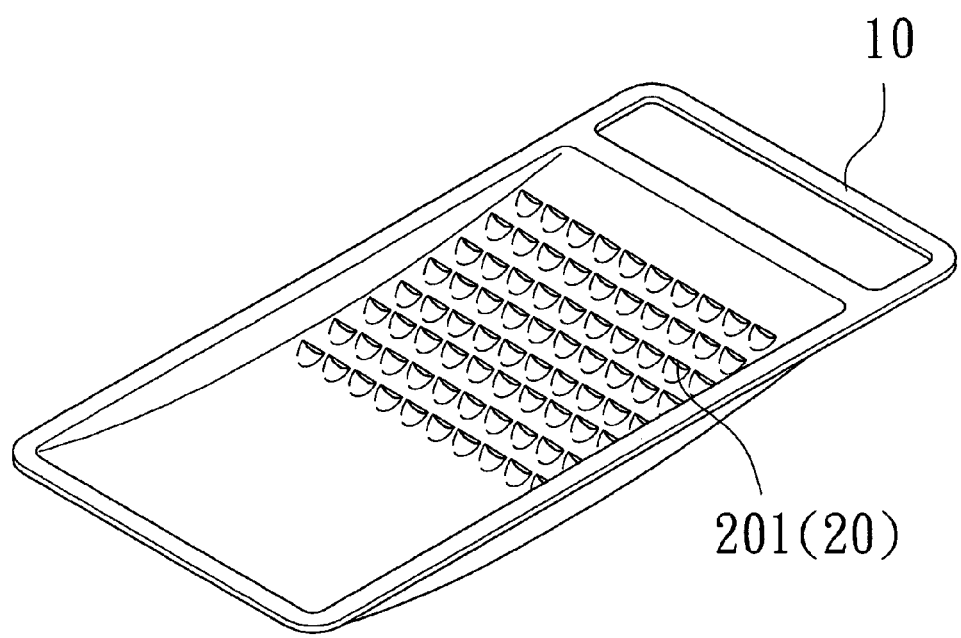
FIG. 8 is a perspective view of the conventional tool for grating fruits as described in the Background.

To use the present tool to grind fruits, referring to FIGS. 6, and 7, first the cap 1 is separated from the main housing 2 with the rotary member 4 and the pressing member being moved together with it. Thus, the tool is opened. Then, fruits are put on the grating surface 52 of the grating member 5, and the cap 1, the rotary member 4, and the pressing member 3 are connected back to the main housing 2 in the above manner so that the tool can be used. Thus, the fruits are pressed against the grating surface 52 by means of the elastic element 34 and the bottom holding surface 35, and can be ground into small pieces with the grating base 5 by means of turning the knob 42 clockwise to make the grinding base 2 turn relative to the pressing member 3; because the guiding bars 21, 22 prevent the pressing member 3 from turning, the fruits will be prevented from moving around by means of the pressing member 3 when the knob 42 is being operated. Finally, small pieces of the fruits are collected for use after passing down via the sharp edged tangential holes 53 of the grating base 5.

From the above description, it can be easily understood that the fruit grating tool of the present invention has advantages as followings:

1. It is not possible for user's hands to touch the sharp portions of the grating base 5 in operating the present tool therefore the tool is safe to use.
2. The user doesn't have to hold fruits in grating the fruits into small pieces with the tool therefore the hands won't have odors of the fruits remaining thereon.
3. The user doesn't have to hold fruits in grating the fruits into small pieces with the tool therefore the fruits are ground in a more hygienic way.
4. Fruits can be completely ground into small pieces with the present tool because fruits will be still pressed against the grating surface 52 by the pressing member 3 when they are getting smaller and smaller in the course of the tool being operated. Therefore, there won't be any waste.

What is claimed is:

1. A fruit grating tool, comprising
    a hollow cap having a through hole on a middle of a top thereof;
    a main housing having openings at upper and lower ends;
    a pressing member; the pressing member being connected to, and up and down movable relative to, the cap; the pressing member being biased down to be away from the cap by means of an elastic element disposed between the pressing member and the cap;
    a rotary member turnably connected to the cap; the rotary member having a shaft passed through both the pressing member and the through hole of the cap; the rotary member having a knob arranged on top of the cap and connected to the shaft;
    the cap being releasably coupled to the upper end of the main housing with the shaft and the pressing member being received in the main housing; the pressing member being prevented from turning relative to the main housing; and
    a grating base arranged under the pressing member in the main housing; the grating base having an upwards projecting connecting post releasably connected to the shaft of the rotary member so that rotation of the knob is passed on to the grating base by the shaft; the grating base having a grating surface on an upper side thereof, and a plurality of sharp edged tangential holes extending from the upper side to a bottom thereof;
    whereby fruits put on the grating surface can be pressed against the grating surface by means of the pressing member, and grated by means of sharp portions of the grating surface when the knob is operated to cause the grating base to rotate; the fruits passing down via the sharp edged tangential holes of the grating base after having been grated into small pieces.

2. The fruit grating tool as claimed in claim 1, wherein the cap has a locating tube projecting down from a middle of a lower side and aligned with the through hole thereof while the pressing member has a locating tube portion at a middle; the elastic element being fitted around the locating tube, and the locating tube portion at upper and lower ends thereof respectively.

3. The fruit grating tool as claimed in claim 1, wherein the main housing is formed with two opposing guiding bars on an inner side thereof while the pressing member has two guiding trenches facing opposite directions on an edge thereof; the guiding trenches being fitted over the guiding bars so that the pressing member is up and down movable in the housing, but incapable of turning.

4. The fruit grating tool as claimed in claim 1, wherein the pressing member has a locating tube portion at a middle, of which an upper end has a smaller inner diameter than other portions thereof, while the shaft has an annular protrusion on around an outer side of a lower end thereof, which has a diameter bigger than the inner diameter of the upper end of the locating tube portion of the pressing member.

5. The fruit grating tool as claimed in claim 1, wherein the connecting post of the grating base is formed so as to have a polygonal horizontal section while a lower end of the shaft has a connecting hole shaped like the connecting post for fitting around the connecting post.

6. The fruit grating tool as claimed in claim 1, wherein a ringed fixed plate is positioned over, and secured to, an annular holding recess formed on a bottom of the main housing for preventing the grating base from falling out of the main housing.

* * * * *